United States Patent [19]

Suzuki et al.

[11] Patent Number: 4,649,073
[45] Date of Patent: Mar. 10, 1987

[54] MAGNETIC RECORDING MEDIUM

[75] Inventors: Toshiyuki Suzuki; Reiji Nishikawa, both of Yokohama, Japan

[73] Assignee: Kabushiki Kaisha Toshiba, Kawasaki, Japan

[21] Appl. No.: 708,939

[22] Filed: Mar. 6, 1985

[30] Foreign Application Priority Data

Mar. 9, 1984 [JP] Japan .................................. 59-45206

[51] Int. Cl.⁴ ............................................... G11B 5/62
[52] U.S. Cl. .................................... 428/212; 428/215; 428/216; 428/457; 428/694; 428/900
[58] Field of Search ............... 428/215, 216, 694, 212, 428/900, 64, 457; 360/131, 135

[56] References Cited

U.S. PATENT DOCUMENTS 4,410,583 10/1983 Hanaoka et al. .................... 428/900

FOREIGN PATENT DOCUMENTS 1530911 11/1978 United Kingdom ................ 428/216

Primary Examiner—George F. Lesmes
Assistant Examiner—William M. Atkinson
Attorney, Agent, or Firm—Oblon, Fisher, Spivak, McClelland & Maier

[57] ABSTRACT

In a magnetic recording disk of a double-sided recording type according to a perpendicular magnetic recording technique of the invention, recording layers having different film thicknesses are formed on two surfaces of a base layer. The film thickness of one magnetic recording layer is set to be larger than the film thickness of the other magnetic recording layer. Thus, a curl phenomenon can be prevented. In addition, a coercive force of the thicker recording layer is set to be higher than that of the thinner recording layer. A difference in a perpendicular recording density between the two recording layers due to a difference in the film thickness thereof can be compensated for.

4 Claims, 4 Drawing Figures

MAGNETIC RECORDING MEDIUM

BACKGROUND OF THE INVENTION

1. Field of the Invention

The present invention relates generally to a perpendicular magnetic recording technique and, more particularly, to a perpendicular magnetic recording medium having recording layers formed on two surfaces of a substrate.

2. Discussion of Background

Recently, a perpendicular magnetic recording technique has been studied as a most promising high-density recording technique which will replace a conventional magnetic recording technique in the near future. According to this technique, residual magnetization is generated in a direction substantially perpendicular to a film surface of a magnetic recording layer of a recording medium, thus realizing high-density magnetic storage of data.

A disk-shaped magnetic recording medium which can record/reproduce data on/from two surfaces thereof is preferably used as a recording medium in the perpendicular magnetic recording technique. This disk-shaped magnetic recording medium is known to persons skilled in the art as a "double-side recording type disk" or a "double-sided diskette". According to the recording disk of this type, first and second magnetic recording films are formed on two surfaces, respectively, of a disk-shaped substrate formed of, e.g., a flexible base layer of a plastic material or the like. These magnetic recording films have an axis easy of magnetization in a direction perpendicular to their surfaces and are, e.g., cobalt-chromium (Co-Cr) films. When a changing magnetic field corresponding to recording data is applied to either of the Co-Cr films by a magnetic head, residual magnetization is formed in correspondence with the magnetic field strength so as to be perpendicular to the film surface, thereby recording data.

When a perpendicular magnetic recording disk as described above is manufactured, Co-Cr magnetic films are generally formed on a substrate or base layer by sputtering or deposing. Since the magnetic films must be formed on two surfaces of the base layer, it is difficult to match physical characteristics of the two magnetic films in this manufacturing process. If waving of the film, i.e., a so-called "curl" phenomenon (this phenomenon is considered to easily occur when a double-sided disk is manufactured) occurs, an intimate contact movement of the magnetic head to the surface of the magnetic film (i.e., uniform head touch) cannot be obtained. The recording head touch onto the surface of the magnetic film is very important for the perpendicular magnetic recording technique which will realize high recording density. Suppression of "curl phenomenon" often prevents a coincidence between the characteristics of two magnetic films or recording films. As a result, noncoincidence or nonuniformity of the recording density between two magnetic films undesirably occurs. This renders the manufacture of a perpendicular magnetic recording medium more difficult.

SUMMARY OF THE INVENTION

It is therefore an object of the present invention to provide a new and improved magnetic recording medium which can be easily manufactured, and wherein two magnetic layers formed on two surfaces of a flexible substrate for perpendicular magnetic recording have the same and uniform recording density.

It is another object of the present invention to provide a new and improved magnetic recording medium which can prevent a curl phenomenon caused by forming recording layers for perpendicular magnetic recording on two surfaces of a flexible substrate, and at the same time, two recording layers have the same and uniform recording density.

The magnetic recording medium according to the perpendicular magnetic recording technique is of a type which can record data on two surfaces thereof. Recording layers having different thicknesses are formed on two surfaces of a base layer. That is, when first and second magnetic recording layers are formed on two surfaces of the base layer, the first magnetic recording layer is designed so as to have a larger thickness than that of the second magnetic layer. Accordingly, the first magnetic recording layer has a higher coercive force than that of the second magnetic layer. The curl phenomenon can be prevented by a difference in thickness between the first and second recording layers formed on two surfaces of the base layer. In order to compensate for a difference in the perpendicular recording density of the two recording layers of the recording disk caused by the difference in thickness, the coercive force of the thicker recording film is set to be higher than that of the thinner one.

BRIEF DESCRIPTION OF THE DRAWINGS

The present invention is best understood by reference to the accompanying drawings, in which.

DETAILED DESCRIPTION OF THE PREFERRED EMBODIMENT

Figure 1:
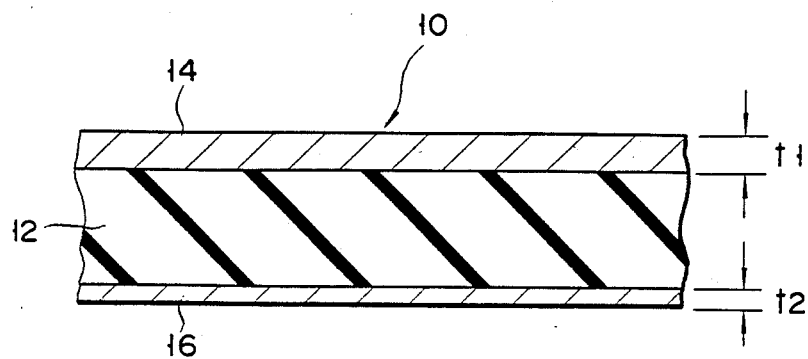
FIG. 1 is a sectional view showing a structure of a magnetic recording disk which can record data in two surfaces thereof according to a perpendicular magnetic recording technique of an embodiment of the present invention.

FIG. 1 is a sectional view showing a structure of a magnetic recording disk 10 based upon a perpendicular magnetic recording technique of one preferred embodiment of the present invention. A flexible substrate (or base layer) 12 is formed of a polymeric plastic material in a disk-shape. First and second magnetic recording layers 14 and 16 are formed on two surfaces of the disk-shaped substrate 12. These recording layers 14 and 16 have an axis easy of magnetization substantially perpendicular to the film surfaces thereof, thereby allowing the recording/reproduction (or writing/reading) of data in accordance with the perpendicular magnetic recording technique. The disk with a structure shown in FIG. 1 is a so-called "double-sided recording disk". In this embodiment, the recording layers 14 and 16 are cobalt-chromium (Co-Cr) films formed by sputtering.

According to the recording disk 10 for perpendicular magnetic recording illustrated in FIG. 1, respective film thicknesses t1 and t2 of the first and second recording layers 14 and 16 are different. In this case, the film thickness t1 of the first recording layer 14 is larger than the thickness t2 of the second recording layer 16. Similarly, a perpendicular coercive force Hc1 of the first recording layer 14 is higher than a perpendicular coercive force Hc2 of the second recording layer 16. These conditions are important technical features of the present invention.

Figure 2:
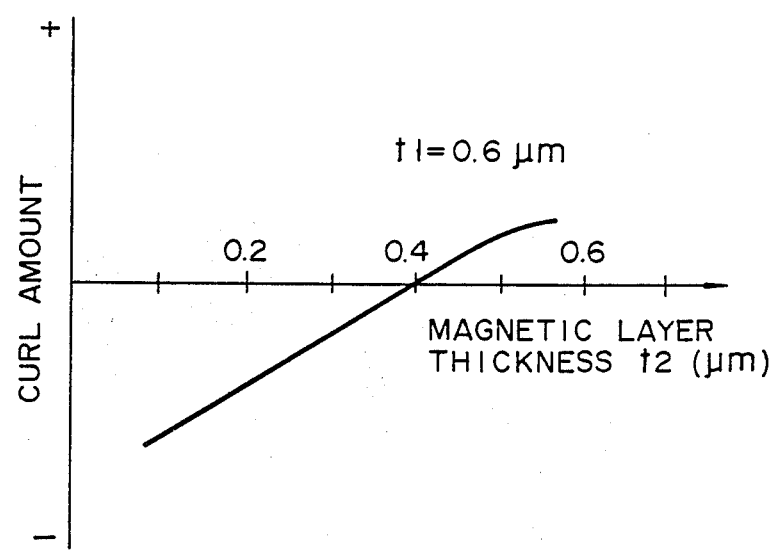
FIG. 2 is a graph showing changes in a curl amount of the magnetic recording disk vs. changes in film thickness of two recording layers thereof.

A difference between the respective film thicknesses t1 and t2 of both the Co-Cr recording layers 14 and 16 can suppress or prevent the "curl phenomenon" which easily occurs when the recording layers 14 and 16 are formed on two surfaces of the substrate 10 and which degrades the tracing performance of the recording head (intimate head contact to the film surfaces). FIG. 2 is a graph showing changes in the curl amount when a ratio of the thicknesses t1 and t2 of the two recording layers 14 and 16 of the recording disk 10 is changed. Note that this graph contains actual measurements obtained by the present inventors. When the thickness of one layer, e.g., the thickness t1 of the first recording layer 14 was fixed at a constant value of 0.6 μm and the thickness of the other layer, e.g., the thickness t2 of the second recording layer 16 was varied within the range between 0.1 μm and 0.6 μm, the curl amount was changed in a substantially linear manner. When the thickness t1 of the recording layer 14 was 0.6 μm and the thickness t2 of the recording layer 16 was 0.4 μm, the curl amount in the magnetic recording disk 10 was zero. In other words, when a ratio (=t2/t1) of the thicknesses t2 and t1 of the two recording layers 16 and 14 was 0.67, the curl amount in the magnetic recording disk 10 was zero. Therefore, when the thicknesses t1 and t2 of the two recording layers 14 and 16 of the disk 10 differ from each other and the ratio thereof is properly set, the curl amount occurring in the double-sided recording type magnetic disk 10 in the manufacturing process can ideally be zero, i.e., can be prevented.

Figure 3:
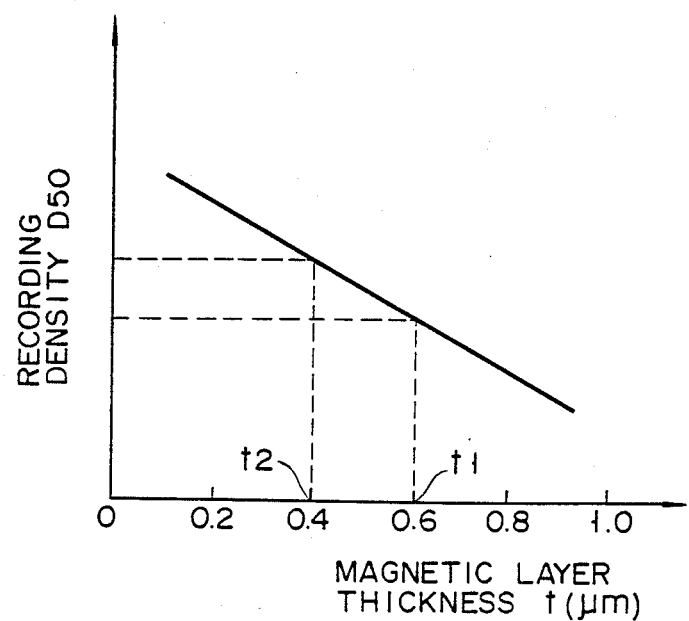
FIG. 3 is a graph showing changes in the recording density of the magnetic recording disk vs. changes in the film thickness of the recording layers thereof.

However, the difference in thickness of the two recording layers 14 and 16 undesirably causes a difference in recording density D thereof. In the double-sided recording disk 10, the recording densities D of the two surfaces are preferably the same. With respect to system design, it is undesirable to have different recording densities D of the two recording layers 14 and 16. Noncoincidence or nonuniformity between the recording densities D of the two recording layers 14 and 16 is caused by a decrease in recording density D50 which is inversely proportional to an increase in the film thickness, as shown in FIG. 3. Note that the "recording density D50" is defined as that at which data reproduction output in the recording layer is half of a maximum reproduction output. Therefore, when the film thicknesses of the two recording layers 14 and 16 of the disk 10 are different from each other, the design of an electronic system (read/write signal processing circuits) using the disk 10 is difficult. In addition, this leads to poor interchangeability between disks.

Figure 4:
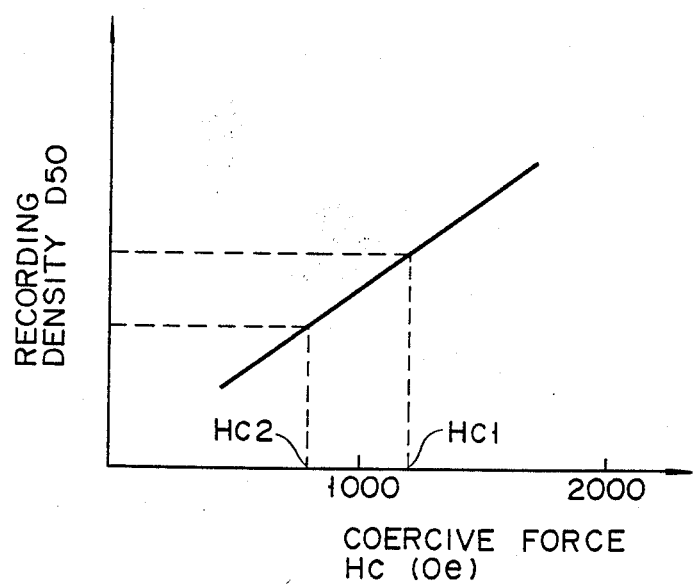
FIG. 4 is a graph showing changes in the recording density of the magnetic recording disk as a function of changes in a perpendicular coercive force of the recording layer thereof.

According to the embodiment of the present invention, noncoincidence between the recording densities D of the recording layers 14 and 16 due to the difference in film thickness thereof can be compensated by properly varying coercive forces Hc1 and Hc2 (to be referred as to perpendicular coercive forces hereinafter) of the layers 14 and 16 which are perpendicular to the film surfaces thereof. In this embodiment, since the thickness t1 of the first recording layer 14 is set to be larger than the thickness t2 of the second recording layer 16, a recording density D1 of the first recording layer 14 is smaller than a recording density D2 of the second recording layer 16. For this reason, as described above, the perpendicular coercive force Hc1 of the first recording layer 14 was set to be higher than the coercive force Hc2 of the second recording layer 16. FIG. 4 is a graph showing changes in the recording density D50 when the thickness t of the recording layer is fixed at a constant value and the perpendicular coercive force Hc of a material constituting the layer is varied. As is apparent from this graph, an increase in the perpendicular coercive force Hc causes an increase in the recording density D50. It should be noted that in the graph of FIG. 4, a scale along the ordinate is not logarithmic, but a normal scale.

To summarize the relationship between the above parameters (i.e., the thickness t and the coercive force Hc), according to the double-sided recording disk 10 for perpendicular magnetic recording of the present invention, (1) in order to prevent the curl phenomenon, the film thickness t1 of the first recording layer 14 is set to be larger than the film thickness t2 of the second recording layer 16, and (2) in order to compensate for the fact that the recording density D1 of the first layer 14 is smaller than the recording density D2 of the second layer 16 due to the difference in the film thickness, the perpendicular coercive force Hc1 of the first layer 14 is set to be higher than the perpendicular coercive force Hc2 of the second layer 16. As a result, according to the present invention, the curl phenomenon in the manufacturing process can be suppressed or prevented, and simultaneously, the recording disk 10 which can perform double-sided perpendicular magnetic recording and has two recording layers 14 and 16 with equal recording densities D can be provided. This recording disk 10 allows easier design of an electronic system and has better interchangeability with other disks.

Although the present invention has been shown and described with reference to particular embodiments, various changes and modifications which are obvious to a person skilled in the art to which the invention pertains are deemed to lie within the scope of the invention.

For example, since the film thickness ratio between the first and second recording layers for suppressing the curl phenomenon differs in accordance with sputtering conditions and the like, it can be different from that in the above embodiment. In this embodiment, the recording layer is constituted by a Co-Cr film, but other alloys, e.g., Co-V, Co-W, Co-Re, Co-Ru, and the like can be used. Furthermore, the present invention can be applied to a magnetic recording medium having a soft magnetic layer beneath a magnetic recording layer consisting of a hard ferromagnetic material.

What is claimed is:

1. A disk-shaped magnetic recording medium which can record data on two surfaces thereof in accordance with a perpendicular magnetic recording technique, comprising:
a flexible base layer; and
magnetic recording layers which sandwich said base layer therebetween and are formed to have different film thicknesses whose ratio is set so as to prevent a curl phenomenon from occurring in said magnetic recording medium, wherein a first recording layer is, thicker than a second recording layer, and has a perpendicular coercive force which is higher than that of said second recording layer so as to compensate for a decrease in a perpendicular recording density of said first recording layer due to the enlargement in thickness thereof, whereby the amount of a curl occurring in said recording medium may be minimized, and any non-coincidence between perpendicular recording densities of said first and second recording layers may be simultaneously compensated for.

2. The disk-shaped magnetic recording medium according to claim 1, wherein said first and second magnetic recording layers comprise alloy films containing metal cobalt.

3. The disk-shaped magnetic recording medium according to claim 1, wherein said first and second recording layers comprise alloy films containing metal cobalt, and wherein the thickness ratio is set to substantially be 3:2, whereby the amount of a curl can be minimized.

4. The disk-shaped magnetic recording medium according to claim 3, wherein the thickness of said first recording layer is set to be 0.6 micrometers, and the thickness of said second recording layer is set to be 0.4 micrometers.

* * * * *